US011457772B2

(12) United States Patent
Zernhelt et al.

(10) Patent No.: US 11,457,772 B2
(45) Date of Patent: Oct. 4, 2022

(54) MANUAL COFFEE GRINDER

(71) Applicant: Helen of Troy Limited, St. Michael (BB)

(72) Inventors: Justin Zernhelt, Springfield, NJ (US); Larry Witt, Califon, NJ (US); James Kwon, Long Island City, NY (US)

(73) Assignee: Helen of Troy Limited, St. Michael (BB)

( * ) Notice: Subject to any disclaimer, the term of this patent is extended or adjusted under 35 U.S.C. 154(b) by 190 days.

(21) Appl. No.: 16/560,396

(22) Filed: Sep. 4, 2019

(65) Prior Publication Data
US 2021/0059473 A1 Mar. 4, 2021

(51) Int. Cl.
*A47J 42/24* (2006.01)
*A47J 42/14* (2006.01)

(52) U.S. Cl.
CPC ............ *A47J 42/24* (2013.01); *A47J 42/14* (2013.01)

(58) Field of Classification Search
CPC .. A47J 42/16; A47J 42/14; A47J 42/18; A47J 42/20; A47J 42/26; A47J 42/32; A47J 42/34; A47J 42/36; A47J 42/46; A47J 42/04
USPC ...................................................... 241/169.1
See application file for complete search history.

(56) References Cited

U.S. PATENT DOCUMENTS

| | | | |
|---|---|---|---|
| 2,863,840 A | 10/1883 | Caine | |
| 565,070 A * | 8/1896 | Freeman | A47J 42/04 241/169.1 |
| 2,671,617 A * | 3/1954 | Talge | A47J 42/04 241/247 |
| 5,518,190 A | 5/1996 | Aebi | |
| 6,196,481 B1 | 3/2001 | Barbagli | |
| 6,805,312 B2 * | 10/2004 | Capp | A47J 27/004 241/199.12 |
| 7,048,216 B2 | 5/2006 | Ng | |
| 7,694,905 B2 | 4/2010 | Fornage | |
| 8,430,021 B2 | 4/2013 | Remo | |

(Continued)

FOREIGN PATENT DOCUMENTS

| | | | | |
|---|---|---|---|---|
| EP | 0281714 A2 * | 9/1988 | ............... | A47J 42/10 |
| EP | 1903094 A1 * | 3/2008 | ............... | B30B 1/20 |

(Continued)

OTHER PUBLICATIONS

Prima Coffee Equipment YouTube—Orphan Espresso Lido ETI Video Overview—https://www.youtube.com/watch?v=jQNmSQw7BMo (Year: 2017).*

(Continued)

*Primary Examiner* — Jessica Cahill
*Assistant Examiner* — Smith Oberto Bapthelus
(74) *Attorney, Agent, or Firm* — Rankin, Hill & Clark LLP

(57) ABSTRACT

A grinder includes a hopper having a top and a bottom and a shaft disposed within the hopper and configured to rotate about a shaft longitudinal axis with respect to the hopper. The shaft includes both a first end nearer to a top of the hopper as compared to a bottom of the hopper and a second end nearer to the bottom of the hopper as compared to the top of the hopper. A blade extends a radial distance outward from the shaft a smaller radial distance at a location on the shaft nearer to the first end of the shaft as compared to a second location on the shaft nearer to the second end.

16 Claims, 7 Drawing Sheets

(56) References Cited

U.S. PATENT DOCUMENTS

| | | |
|---|---|---|
| 8,534,579 B2 | 9/2013 | Carapelli |
| 2014/0252149 A1* | 9/2014 | Ding .................. A47J 42/38 |
| | | 241/88.1 |
| 2016/0051081 A1* | 2/2016 | Grassia ............... A47J 31/4403 |
| | | 99/280 |
| 2016/0135646 A1 | 5/2016 | Caccianmani |
| 2017/0021315 A1* | 1/2017 | Rukavina .............. B01F 7/0025 |
| 2017/0135525 A1* | 5/2017 | Bougerol ................ A47J 42/04 |
| 2018/0353012 A1* | 12/2018 | Lauzet ................... A47J 42/04 |

FOREIGN PATENT DOCUMENTS

| | | | |
|---|---|---|---|
| FR | 460578 | | 10/1913 |
| GB | 0602227 | * | 5/1948 |
| GB | 788524 A | * | 1/1958 .............. A47J 42/04 |

OTHER PUBLICATIONS

Lido manual detail (Year: 2017).*

* cited by examiner

MANUAL COFFEE GRINDER

BACKGROUND

Handheld grinders employed for preparing grounds, such as coffee grounds, typically feature hand-cranked burrs or grinding mechanisms configured for grinding contents provided in an attached hopper. In configurations of grinders featuring attached hoppers, means for delivering contents from the hopper to the grinding mechanisms must be employed while the grinder is in use. Also, to be ergonomic, hoppers included in handheld grinders feature limited overall size. In order to maximize storage capacity in an ergonomic space, such hoppers feature vacant interiors and rely solely on gravity to deliver contents in the hopper to the grinding mechanism while the grinder is in use. Consequently, conventional hoppers strictly require a relatively vertical orientation in agreement with the direction of gravity in order to functionally deliver contents from the hopper to the grinding mechanism. For this reason, handheld grinders often cannot reliably function when tilted from a vertical orientation and in this regard lack a robust usability.

SUMMARY

According to one aspect, a grinder includes a hopper having a top and a bottom, and a shaft that is disposed within the hopper and configured to rotate about a shaft longitudinal axis with respect to the hopper. The shaft includes both a first end nearer to the top of the hopper as compared to the bottom of the hopper and a second end nearer to the bottom of the hopper as compared to the top of the hopper. A blade extends a radial distance outward from the shaft a smaller radial distance at a location on the shaft nearer to the first end of the shaft as compared to a second location on the shaft nearer to the end.

According to another aspect, a grinder includes a hopper having a top and a bottom, and a shaft that is disposed within the hopper and configured to rotate about a shaft longitudinal axis with respect to the hopper. The shaft includes a first end nearer to the top of the hopper as compared to the bottom of the hopper and a second end nearer to the bottom of the hopper as compared to the top of the hopper. The grinder also includes a hub fixed to the shaft with respect to the shaft longitudinal axis, and a crank arm pivotally fixed to the hub and configured for transferring torque to the shaft with respect to the shaft longitudinal axis.

According to another aspect, a method of operating a grinder including a hopper includes holding the grinder offset from a vertical orientation, turning a shaft and a blade with respect to a hopper, and turning a first burr with respect to a second burr, such that the blade directs hopper contents toward at least one of the burrs.

DETAILED DESCRIPTION

Figure 1:
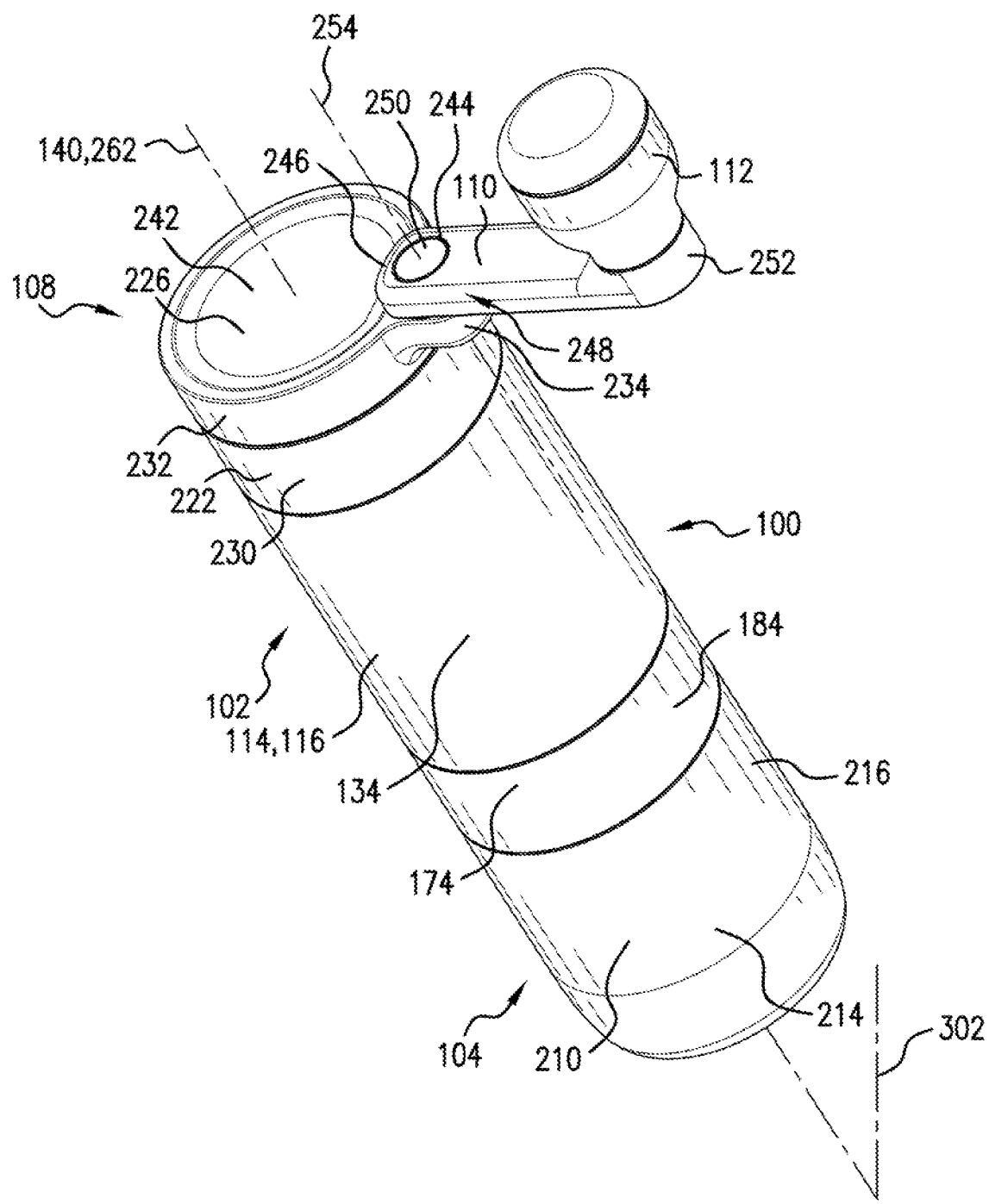
FIG. 1 is a perspective view of an exemplary grinder.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a grinder 100 including a hopper 102, a container 104, a lid 108, and a crank arm 110 with a knob 112. The hopper 102 is ergonomically sized for handheld use such that the hopper 102 fits in the hands of a user, and is configured for storing material such as coffee beans, grains, spices, and cereals for being ground within in the grinder 100.

Figure 2:
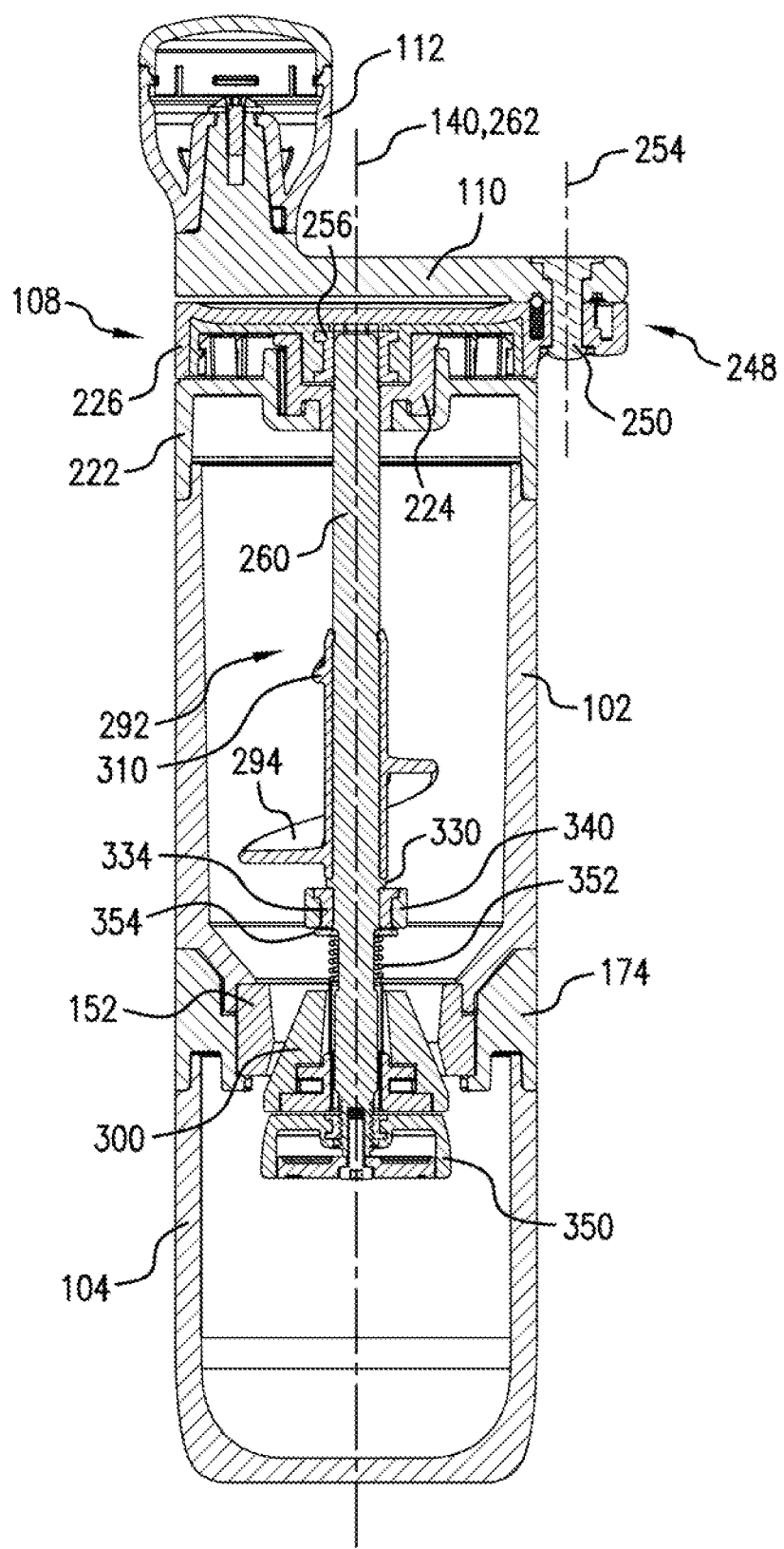
FIG. 2 is a cross-sectional front view of the grinder.
Figure 4:
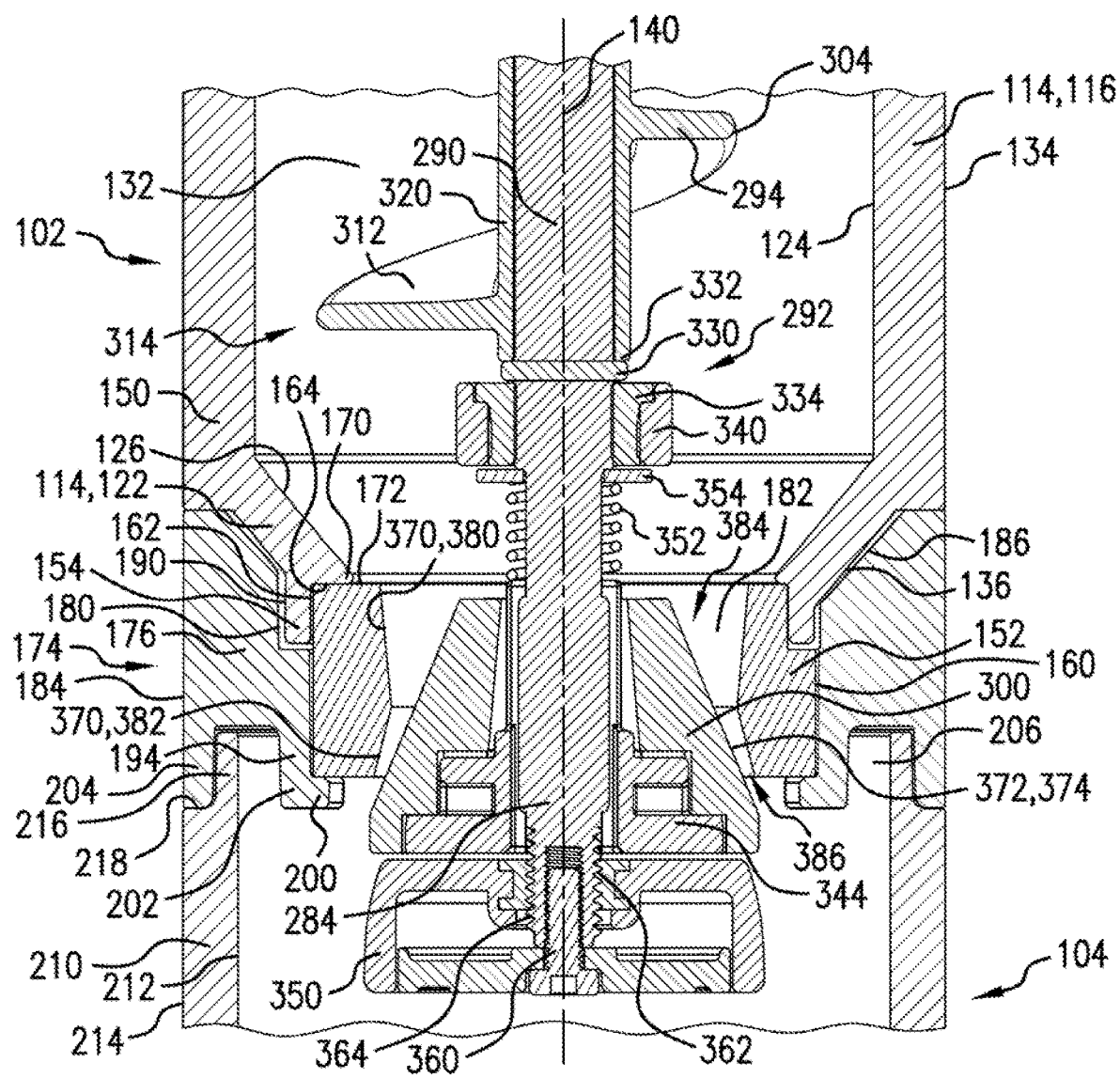
FIG. 4 is a cross-sectional front view of a lower portion of the grinder.

As shown in FIGS. 2 and 4, the hopper 102 features a hopper wall 114 including a first hopper wall 116 and a second hopper wall 122, each of which have a respective interior surface 124, 126 defining an interior 132 of the hopper 102, and an exterior surface 134, 136 defining an exterior of the hopper 102. The first hopper wall 116 is generally cylindrical, such that the interior surface 124 of the first hopper wall 116 is equidistant from a hopper central axis 140, and includes a top 142 which defines a top opening 144 of the hopper 102. The second hopper wall 122 extends downward from a bottom 150 of the first hopper wall 116 and inward toward the hopper central axis 140, such that the second hopper wall 122 is inclined toward the hopper central axis 140 and a first burr 152 disposed underneath the first hopper wall 116.

As depicted, a bottom hopper flange 154 extends downward from the second hopper wall 122 and engages the first burr 152 at an exterior surface 160 of the first burr 152 with an interior surface 162 of the bottom hopper flange 154. In this configuration, the bottom hopper flange 154 aligns the first burr 152 with respect to the hopper central axis 140 when the hopper 102 is assembled with the first burr 152. A bottom surface 164 of the second hopper wall 122 extends closer to the hopper central axis 140 as compared to the interior surface 162 of the bottom hopper flange 154, thereby forming a hopper ridge 170. The hopper ridge 170 is configured to obstruct the first burr 152 from traveling upwards beyond the vertical height of the bottom hopper flange 154 and into the interior 132 of the hopper 102 by abutting a top surface 172 of the first burr 152.

Figure 7:
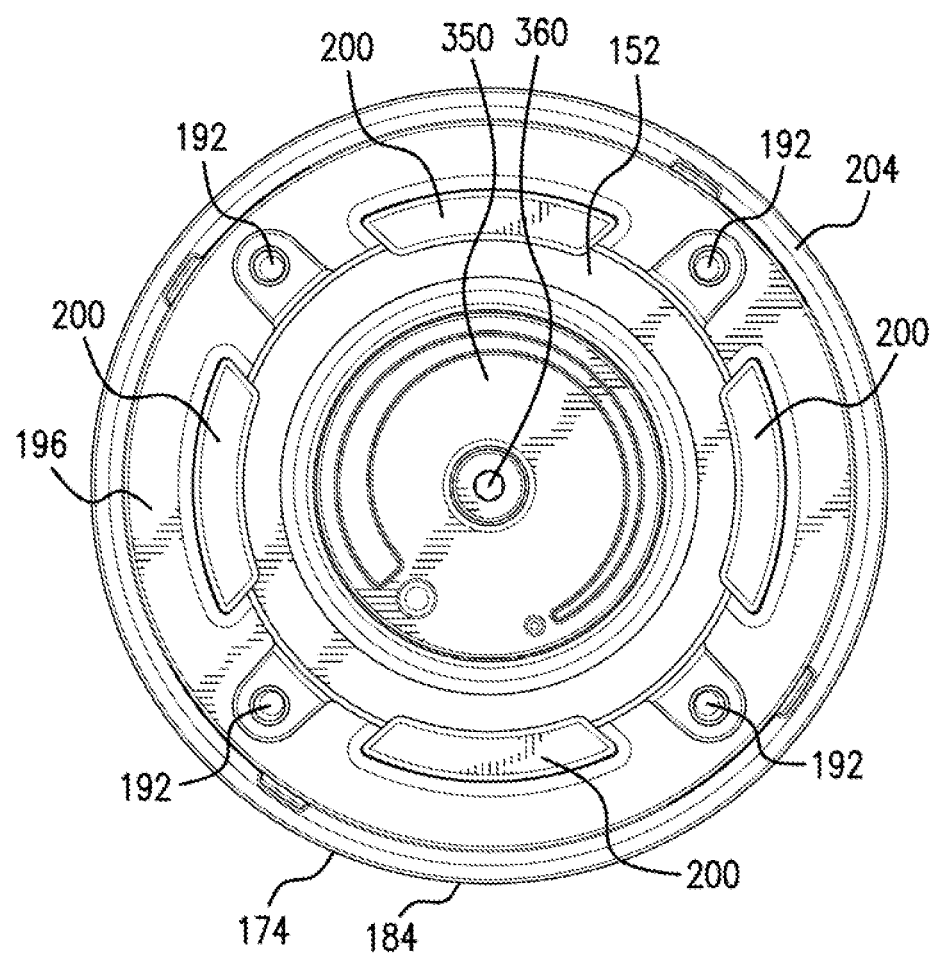
FIG. 7 is a bottom view of the shaft assembly disposed in the hopper.

As depicted, a retainer 174 disposed under the hopper 102 includes a retainer body 176 having in interior surface 180 defining a first retainer interior 182, an exterior surface 184 defining an exterior of the retainer 174, which defines the exterior of the grinder 100 when the grinder 100 is assembled. An upper surface 186 of the retainer 174 is inclined away from the interior 132 of the hopper 102 and is thereby configured to mate with the exterior surface 136 of the second hopper wall 122. With this configuration, the retainer 174 is disposed on both the exterior surface 136 of the second hopper wall 122 and an exterior surface 190 of the bottom hopper flange 154. As shown in FIG. 7, the retainer 174 features retainer screw holes 192 configured for having screws disposed therein and into the hopper 102 when the retainer 174 is assembled with the hopper 102, fixing the retainer 174 to the hopper 102. Alternatively, the retainer 174 is made of a sufficiently flexible material to removably attach the retainer 174 to the hopper 102 by hand.

The retainer 174 is also disposed around the exterior surface 160 of the first burr 152 and is configured to align the first burr 152 with respect to the hopper central axis 140. The retainer 174 also includes a first retainer flange 194 which extends downward from a bottom surface 196 of the retainer 174, continuing the interior surface 180 of the retainer body 176 along the exterior surface 160 of the first burr 152. A lip 200 disposed on the first retainer flange 194 extends radially inward toward the hopper central axis 140 from a bottom portion 202 of the first retainer flange 194, and is configured to obstruct the first burr 152 from traveling downward through the retainer 174 when the first burr 152 is assembled with the retainer 174.

A second retainer flange 204 extends downward from the bottom surface 196 of the retainer 174, continuing the exterior surface 184 of the retainer 174, and defining a second retainer interior 206 between the first retainer flange 194 and the second retainer flange 204. The second retainer flange 204 is configured for receiving the container 104 in the second retainer interior 206.

The container 104 includes a container wall 210 having an interior surface 212 configured for containing grounds, and an exterior surface 214 that defines both an exterior of the container 104 and the exterior of the grinder 100 when the container 104 is assembled with the grinder 100. A container flange 216 extends upwards from an upper surface 218 of the container 104, continuing the interior surface 212 of the container 104, and is configured engage with the second retainer flange 204 so as to removable attach the container 104 to the retainer 174. The retainer 174 is made of a sufficiently flexible material to removably attach the container 104 to the retainer by hand.

A hopper flange 220 extends upwards from the top 142 of the first hopper wall 116, continuing the interior surface 124 of the first hopper wall 116, and is configured to engage a lid portion 222. As depicted, the lid 108 covers the top opening 144 of the hopper 102 with the lid portion 222 disposed on the top 142 of the first hopper wall 116. The lid portion 222 retains a first bearing 224 on which a hub 226 is disposed. Each of the lid portion 222 and the hub 226 includes an exterior surface 230, 232 that respectively defines an exterior of the lid portion 222 and an exterior of the hub 226. The exterior surfaces 230, 232 of the lid portion 222 and the hub 226 also define the exterior of the grinder 100 when the grinder 100 is assembled with the lid portion 222 and the hub 226. The exterior surfaces 230, 232, 134, 184, 214 of the lid portion 222, the hub 226, the first hopper wall 116, the retainer 174, and the container 104 respectively are aligned with each other when the grinder 100 is assembled.

Figure 5:
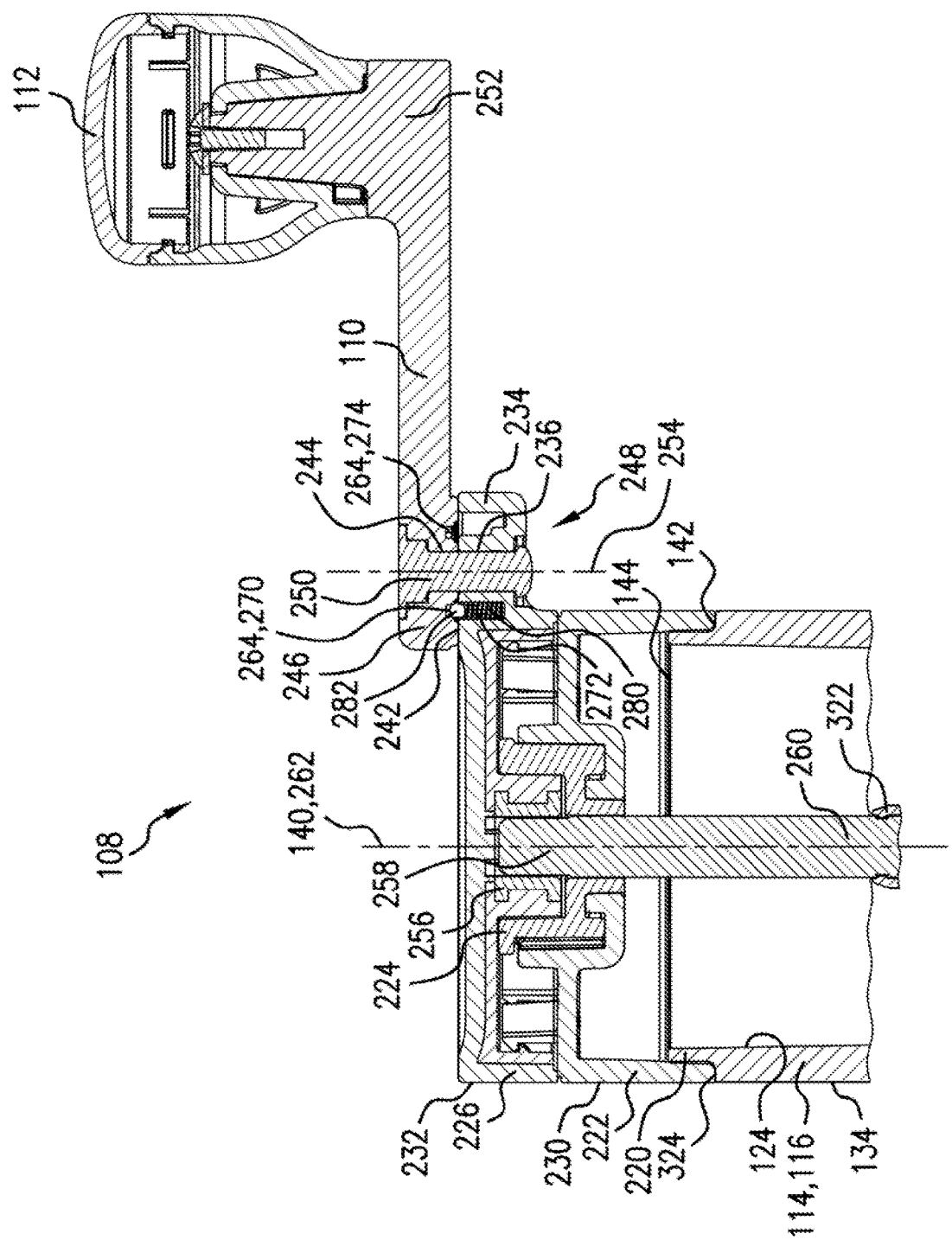
FIG. 5 is a cross-sectional front view of an upper portion of the grinder.
Figure 6:
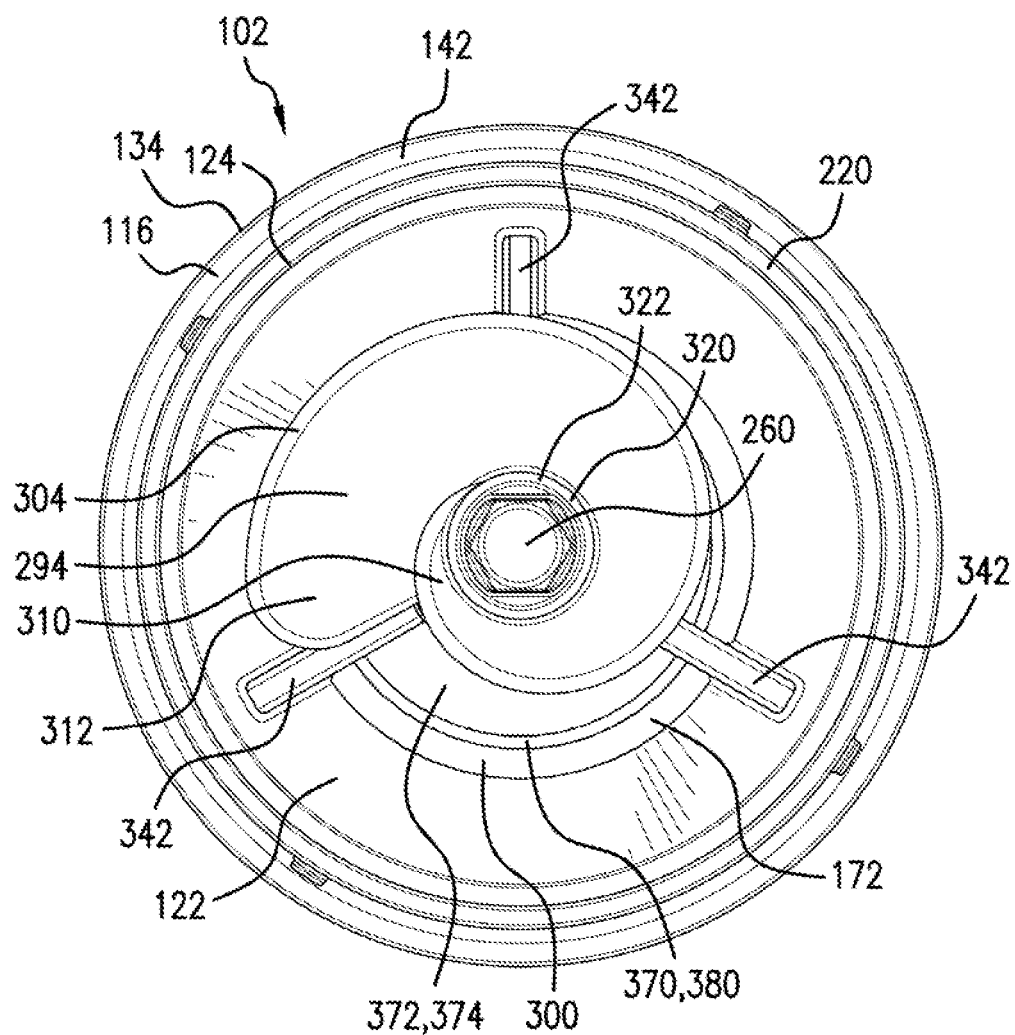
FIG. 6 is a top view of the shaft assembly disposed in a hopper incorporated in the grinder.

A hub flange 234 extends radially from the exterior surface 232 of the hub 226, and defines an aperture 236 therethrough. As shown in FIGS. 1 and 2, the crank arm 110 is disposed on an upper surface 242 of the hub 226 and features an aperture 244 defined through a first end 246 of the crank arm 110. As shown in FIG. 5, the crank arm 110 is fixed to the hub 226 at a joint 248 defined by a pin 250 disposed through both the aperture 236 of the hub 226 and the aperture 244 of the crank arm 110. As depicted, the joint 248 is radially offset from the shaft longitudinal axis 262. The knob 112 is disposed on a second end 252 of the crank arm 110 opposite from the aperture 244 of the crank arm 110, and is configured for being gripped and maneuvered by a user exerting torque on the knob 112 sufficient to turn the hub 226 with respect to the lid portion 222. In this manner, the crank arm 110 is pivotally fixed to the hub 226 and configured to pivot about the joint 248 with respect to the exterior surface 232 of the hub 226 between a grinding position shown in FIG. 1 and a storage position shown in FIG. 2.

In the grinding position, the crank arm 110 is extended farther from the shaft longitudinal axis 262 relative to the storage position so as to provide a relatively large moment arm when the grinder 100 is in use, and relatively compact storage volume when the grinder 100 is not in use. Also in the grinding position, because the hub 226 is fixed to the shaft 260 and configured to rotate the shaft 260 about the shaft longitudinal axis 262, the crank arm 110 is configured for transferring torque to the shaft 260 with respect to the shaft longitudinal axis 262. As shown in FIGS. 1 and 2, a pivot axis 254 of the crank arm 110 is defined by a range of motion of the crank arm 110 about the joint 248 with respect to the exterior surface 232 of the hub 226 and is parallel to the shaft longitudinal axis 262.

As shown in FIG. 5, the joint 248 includes a locking mechanism 264 configured to lock the crank arm 110 in the grinding position by moving a first detent 270 defined in the crank arm 110 over a spring plunger 272 disposed in the hub flange 234 when the crank arm 110 is actuated into the grinding position. The locking mechanism 264 is also configured to lock the crank arm 110 in the storage position by moving a second detent 274 defined in the crank arm 110 over the spring plunger 272 when the crank arm 110 is actuated into the storage position. As shown, the spring plunger 272 includes a detent spring 280 and a ball 282, wherein the detent spring 280 exerts an elastic force onto the ball 282 toward the crank arm 110, bringing the ball 282 in constant contact with the crank arm 110. Because of this, when the crank arm 110 pivots so as to align one of the detents 270, 274 with the spring plunger 272, the detent spring 280 pushes the ball 282 into the detent 270, 274, thereby locking the crank arm 110 in a position corresponding to the detent 270, 274.

As shown in FIG. 5, a drive nut 256 fixed to a first end 258 of the shaft 260 between the hub 226 and the first bearing 224 is configured for transferring torque from the hub 226 to the shaft 260 through the first end 258 of the shaft 260. The first bearing 224 is disposed on the first end 258 of the shaft 260 such that the first bearing 224 supports and orients the shaft 260 within the hopper 102 at the first end 258 of the shaft 260 and allows the shaft 260 to rotate about a shaft longitudinal axis 262. When assembled with the hopper 102, the first end 258 of the shaft 260 is a top end that is nearer to the top 142 of the first hopper wall 116 as compared to the bottom 150 of the first hopper wall 116, and a second end 284 of the shaft 260 is a bottom end which is nearer to the bottom 150 of the first hopper wall 116 as compared to the top 142 of the first hopper wall 116. A midsection 290 of the shaft 260 connects the first end 258 and the second end 284 such that the first end 258 and the second end 284 are opposite ends of the shaft 260. As depicted, the shaft 260 is coaxially aligned with the hopper 102 by the first bearing 224.

The drive nut 256 sits on the first bearing 224 and is rotationally fixed to the shaft 260. The first bearing 224 retains the drive nut 256 in a position axially centered about the hopper central axis 140 such that the shaft longitudinal axis 262 is aligned with the hopper central axis 140. In this manner, the first bearing 224 allows the drive nut 256 and shaft 260 to rotate about the hopper central axis 140 when a user turns the hub 226 with respect to the lid portion 222 and the hopper 102, thereby driving a shaft assembly 292 depicted in FIG. 3, including a blade 294 and a second burr 300.

Figure 3:
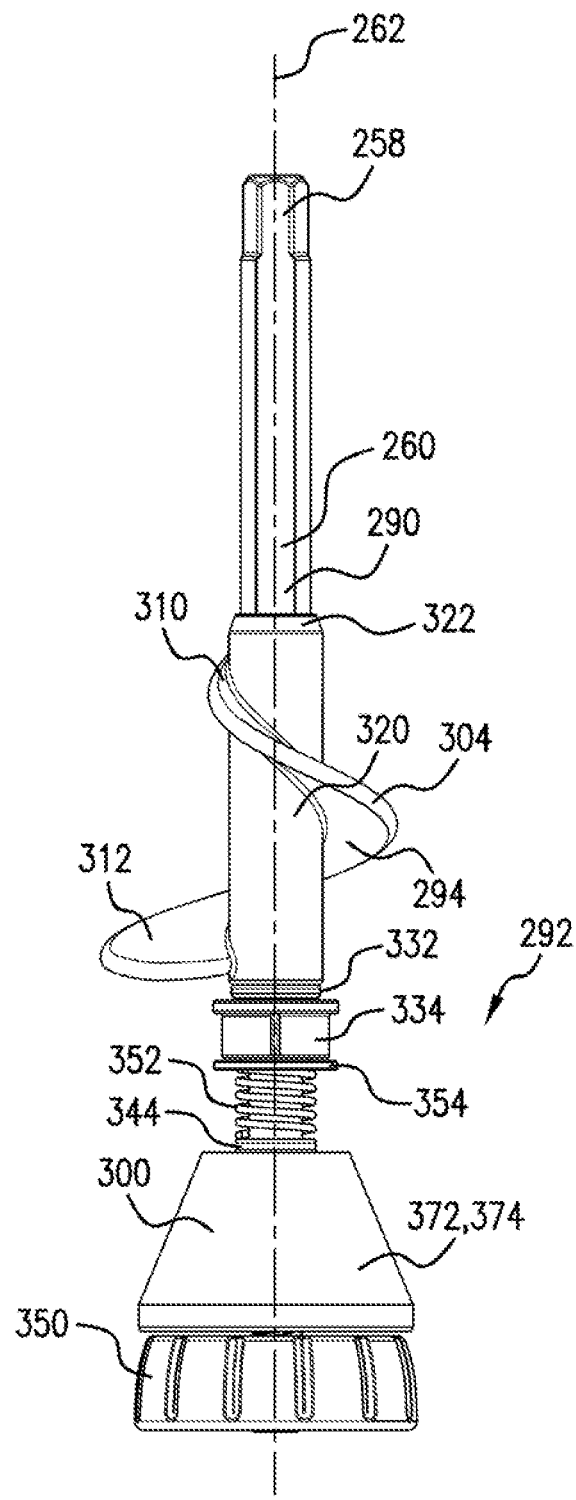
FIG. 3 is a front view of a shaft assembly incorporated in the grinder.

The blade 294 is configured for pushing contents in the hopper 102 toward the first burr 152 and the second burr 300 when the blade 294 rotates about the shaft longitudinal axis 262 with respect to the hopper 102. As shown in FIGS. 2-4, the blade 294 is a conical helix that is coaxial with the shaft longitudinal axis 262, and extends a radial distance outward from the shaft 260 a smaller radial distance at a location on the shaft 260 nearer to the first end 258 of the shaft 260 as compared to a second location on the shaft 260 nearer to the second end 284. More specifically, as shown in FIG. 2, the blade 294 features a constant radial inclination with respect to the shaft 260. Taken from a front view perspective of the shaft 260 and the blade 294 as depicted, the blade 294 extends in a direction orthogonal to the shaft longitudinal axis 262. With this construction, the grinder 100 may be oriented as shown in FIG. 1, with the shaft longitudinal axis 262 and the pivot axis 254 of the crank arm 110 parallel to each other and angularly offset from a vertical axis 302.

As shown in FIGS. 3 and 4, an edge 304 disposed on a side of the blade 294 opposite from the shaft 260 and from a top 310 of the blade 294 to a bottom 312 of the blade 294 is rounded. As shown in FIG. 4, the bottom 312 of the blade 294 is also rounded in a direction orthogonal to the shaft longitudinal axis 262 taken from a top view of the shaft 260 and the blade 294. When the blade 294 is assembled with the hopper 102, the edge 304 at the bottom 312 of the blade 294 is spaced from the interior surface 124 of the first hopper wall 116 so as to define an opening 314 therebetween. Measured in a radial direction with respect to the blade 294 and the hopper 102, the opening 314 has a length less than one grain, granule, or singular item typified by contents of the hopper 102. In an embodiment of the grinder 100 configured for preparing coffee grounds, the opening 314 has a length less than one coffee bean typical of a plurality of coffee beans to be disposed in the hopper 102, measured in the radial direction of the blade 294 and the hopper 102.

As shown in FIGS. 2-4, the blade 294 extends from the midsection 290 of the shaft 260 between the first end 258 of the shaft 260 and the second end 284 of the shaft 260, and is provided on a fitting 320 disposed around and fixed to the shaft 260 for rotation with the shaft 260. A top 322 of the fitting 320 is spaced from a top surface 324 of the hopper 102 on the top 142 of the first hopper wall 116, nearer to the midsection 290 of the shaft 260 as compared to each of the first end 258 of the shaft 260 and the second end 284 of the shaft 260. Because an ergonomic handheld hopper is limited in size and consequently storage capacity, reducing the dimensions of the blade 294 in the hopper 102 advantageously increases the storage capacity of the hopper 102 and ultimately the amount of grounds the grinder 100 may produce without refilling the hopper 102. To this end, because the blade 294 does not go to the top surface 324 of the hopper 102, more space within the hopper 102 is available for storing contents to be ground. The shaft 260 includes a ridge 330 extending radially outward from the shaft 260 and abuts a bottom 332 of the fitting. In this manner, the ridge 330 is configured for obstructing the fitting 320 from moving axially along the shaft 260 over the ridge 330 such that the fitting 320 is vertically supported on the ridge 330.

As shown in FIG. 4, when the shaft 260 is assembled with the hopper 102, the ridge 330 sits on a second bearing 334 through which the second end 284 of the shaft 260 is disposed. The second bearing 334 is supported within the hopper 102 nearer to the bottom 150 of the first hopper wall 116 as compared to the top 142 of the first hopper wall 116, and aligned with the hopper central axis 140 by a seat 340 and at least one supporting beam 342 extending from the interior surface 126 of the second hopper wall 122. In this manner, the second bearing 334 supports and orients the shaft 260 within the hopper 102 at the second end 284 of the shaft 260 and allows the shaft 260 to rotate about the shaft longitudinal axis 262.

The second burr 300, a burr holder 344, and an adjustment ring 350 are each disposed on the second end 284 of the shaft 260. The second burr 300 is mounted on the burr holder 344 such that a position of the burr holder 344 with respect to the shaft longitudinal axis 262 corresponds to a position of the second burr 300 with respect to the shaft longitudinal axis 262. A spring 352 disposed around the shaft 260 between a washer 354 that abuts the seat 340 and the burr holder 344 biases the burr holder 344 against the adjustment ring 350, such that the adjustment ring 350 retains the second burr 300 on the second end 284 of the shaft 260. The burr holder 344 is configured for being repositioned along the shaft 260 via the adjustment ring 350, which supports the burr holder 344 on the shaft 260 and is fastened to the second end 284 of the shaft 260 with an adjustment ring screw 360 disposed through the adjustment ring 350 and into the shaft 260. As depicted, the adjustment ring 350 and the second end 284 of the shaft 260 feature complementary threaded surfaces 362, 364 respectively mated to each other such that a user may turn the adjustment ring 350 to adjust a position of the adjustment ring 350 with respect to the shaft longitudinal axis 262 when the adjustment ring 350 is assembled with the shaft 260.

The first burr 152 features at least one grinding surface 370, and the second burr 300 features at least one grinding surface 372 that faces the at least one grinding surface 370 of the first burr 152. Per the embodiment depicted in FIG. 4, the second burr 300 features a grinding surface 374 that is inclined with respect to the shaft longitudinal axis 262, and the first burr 152 features a first grinding surface 380 and a second grinding surface 382 which are inclined with respect to the shaft longitudinal axis 262. In this configuration, the first grinding surface 380 of the first burr 152 and the grinding surface 374 of the second burr 300 are spaced from each other to define a first burr opening 384 which, measured in a radial direction with respect to the first burr 152 and the second burr 300, has a length of at least one grain, granule, or singular item typified by contents of the hopper 102. In an embodiment of the grinder 100 configured for preparing coffee grounds, the first burr opening 384 has a length of approximately one coffee bean typical of a plurality of coffee beans to be disposed in the hopper 102, measured in a radial direction of the first burr 152 and the second burr 300 when the first burr 152 is assembled with the second burr 300.

The grinding surface 374 of the second burr 300 and the second grinding surface 382 of the first burr 152 are spaced from each other to define a second burr opening 386 that defines the size of grounds produced by the grinder 100. Measured in a radial direction with respect to the first burr 152 and the second burr 300, the second burr opening 386 has a length smaller than that of one grain, granule, or singular item typified by contents of the hopper 102. In an embodiment of the grinder 100 configured for preparing coffee grounds, the second burr opening 386 has a length smaller than one coffee bean typical of a plurality of coffee beans to be disposed in the hopper 102, measured in a radial direction with respect to the first burr 152 and the second burr 300 when the first burr 152 is assembled with the second burr 300.

The grinding surfaces 380, 382 of the first burr 152 are vertically offset above the grinding surface 374 of the second burr 300 such that the first burr 152 is an upper burr and the second burr 300 is a lower burr. The vertical offset between the at least one grinding surface 370 of the first burr 152 and the at least one grinding surface 372 of the second burr 300 is adjustable by repositioning the second burr 300 along the shaft longitudinal axis 262 via the adjustment ring 350. In this manner, a user may adjust the size of grounds produced from between the respective grinding surfaces 370, 372 of the first burr 152 and the second burr 300, and the size of the second burr opening 386 by adjusting the position of the adjustment ring 350 along the shaft longitudinal axis 262.

The discussed embodiment enables a method of operating the grinder 100 with the hopper central axis 140 offset from the vertical axis 302 with contents stored in the hopper 102 still being directed toward the burrs 152, 300. The method includes holding the grinder 100 offset from a vertical orientation and turning the shaft 260 and the blade 294 with respect to the hopper 102 and turning the first burr 152 with respect to the second burr 300 such that the blade 294 directs contents in the hopper 102 toward the burrs 152, 300 and the contents are ground between the first burr 152 and the second burr 300. The method may also include collecting ground hopper contents that fall from the hopper 102 in the container 104, or if desired the container 104 may not be provided connected with the hopper 102, or the contents may be ground without a container. The method may further include moving the crank arm 110 from the storage position to the grinding position prior to turning the shaft 260, the crank arm 110 being pivotally fixed to the shaft 260 and configured to lock into the grinding position.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A grinder, comprising:
   a hopper having a top and a bottom,
   a shaft that is disposed within the hopper and configured to rotate about a shaft longitudinal axis with respect to the hopper, and includes a first end nearer to the top of the hopper as compared to the bottom of the hopper and a second end nearer to the bottom of the hopper as compared to the top of the hopper, and
   a blade configured to rotate with the shaft, wherein a top of the blade extends a radial distance outward from the shaft a smaller radial distance at a location on the shaft nearer to the first end of the shaft as compared to a bottom end of the blade at a second location on the shaft nearer to the second end,
   wherein the bottom end of the blade has a top surface and a bottom surface that extend in parallel with each other, in a direction orthogonal to the shaft longitudinal axis, and
   wherein the bottom end of the blade is rounded both along an edge of the blade, and in the direction orthogonal to the shaft longitudinal axis taken from a front view perspective of the shaft and the blade.

2. The grinder of claim 1, wherein the blade is a conical helix blade that is coaxial with the shaft longitudinal axis.

3. The grinder of claim 1, wherein the edge of the blade is disposed on a side of the blade opposite from the shaft such that the edge and an interior surface of the hopper define a gap with a radial opening with respect to the shaft that is less than one coffee bean.

4. The grinder of claim 1, wherein the blade features a constant radial inclination with respect to the shaft.

5. The grinder of claim 1, wherein the blade extends from a midsection of the shaft between the first end of the shaft and the second end of the shaft.

6. The grinder of claim 1, further comprising:
   a retainer fixed to the bottom of the hopper;
   a first burr fixed within the retainer; and
   a second burr disposed on the second end of the shaft.

7. The grinder of claim 6, further comprising a container removably connected to the hopper.

8. The grinder of claim 1, further comprising a crank arm pivotally fixed to the shaft from a joint radially offset from the shaft longitudinal axis, the crank arm being configured to pivot about the joint between a grinding position and a storage position,
   wherein the grinding position maintains the crank arm extended farther from the shaft longitudinal axis relative to the storage position.

9. The grinder of claim 1, further comprising a first burr fixed to the bottom of the hopper, wherein the bottom end of the blade is located closer to the first burr as compared to a top of the blade along the shaft longitudinal axis.

10. The grinder of claim 1, further comprising a first burr fixed to the bottom of the hopper, and a second burr retained on the shaft, wherein the blade is configured for pushing contents in the hopper toward the first burr and the second burr when the blade rotates about the shaft longitudinal axis with respect to the hopper.

11. A grinder, comprising:
   a hopper having a top and a bottom,
   a shaft that is disposed within the hopper and configured to rotate about a shaft longitudinal axis with respect to the hopper, and includes a first end nearer to the top of the hopper as compared to the bottom of the hopper and a second end nearer to the bottom of the hopper as compared to the top of the hopper,
   a hub fixed to the shaft with respect to the shaft longitudinal axis,
   a crank arm pivotally fixed to the hub and configured for transferring torque to the shaft with respect to the shaft longitudinal axis,
   a ridge extending radially outward from the shaft,
   a fitting disposed around the shaft, wherein the ridge is configured for preventing the fitting from moving axially along the shaft over the ridge,
   a blade provided on the fitting for rotation with the shaft, wherein the blade extends along the shaft from a midsection of the shaft between the first end of the shaft and the second end of the shaft, and
   a bearing positioned within the hopper, wherein the second end of the shaft is disposed through the bearing and the ridge is seated on the bearing such that the bearing supports the shaft within the hopper at the second end of the shaft and allows the shaft to rotate about the shaft longitudinal axis with respect to the hopper, and the ridge abuts a bottom of the fitting to prevent the fitting from moving axially along the shaft over the ridge.

12. The grinder of claim 11, wherein a top of the fitting is spaced axially from the top of the hopper.

13. The grinder of claim 11, wherein a top of the fitting is disposed nearer to a vertical midsection of the shaft as compared to each of the first end of the shaft and the second end of the shaft.

14. The grinder of claim 11, further comprising a locking mechanism configured to lock the crank arm in a grinding position.

15. The grinder of claim 14, wherein a pivot axis of the crank arm defined by a range of motion of the crank arm with respect to the hub is parallel to the shaft longitudinal axis.

16. A method of operating a grinder comprising a hopper, the method comprising:
- moving a crank arm from a storage position to a grinding position, the crank arm being pivotally fixed to a shaft disposed in the hopper,
- locking the crank arm in the grinding position by moving a first detent defined in the crank arm over a spring plunger disposed in a hub fixed to the shaft, including pivoting the crank arm to align the first detent with the spring plunger such that the spring plunger pushes into the first detent, thereby locking the crank arm in the grinding position such that the crank arm is configured for transferring torque to the shaft,
- holding the grinder offset from a vertical orientation,
- turning the shaft and a blade with respect to the hopper, and turning a first burr with respect to a second burr, pivoting the crank arm to align a second detent with the spring plunger such that the spring plunger pushes into the second detent, thereby locking the crank arm in the storage position such that the blade directs hopper contents toward at least one of the burrs,
- moving the crank arm from the grinding position to the storage position, and
- locking the crank arm in the storage position by moving the second detent defined in the crank arm over the spring plunger disposed in the hub.

* * * * *